United States Patent [19]

Rathi et al.

[11] Patent Number: 5,285,572
[45] Date of Patent: Feb. 15, 1994

[54] METHOD AND SYSTEM FOR MACHINING CONTOURED PARTS

[75] Inventors: Rajendra P. Rathi, West Chester; David C. Fairbourn, Fairfield; Joseph H. Nurre, Athens, all of Ohio

[73] Assignee: General Electric Company, Cincinnati, Ohio

[21] Appl. No.: 928,384

[22] Filed: Aug. 12, 1992

[51] Int. Cl.$^5$ .................... B23P 6/04; B23C 3/18
[52] U.S. Cl. ................. 29/889.1; 29/564.7; 364/474.29; 409/80; 409/84
[58] Field of Search ............ 29/889.1, 406.6, 33 R, 29/564.7; 409/79, 80, 84, 131, 132; 364/474.25, 474.29, 474, 32, 474.33

[56] References Cited

U.S. PATENT DOCUMENTS

| | | | |
|---|---|---|---|
| 4,141,127 | 2/1979 | Cretella et al. | 29/889.1 |
| 4,811,253 | 3/1989 | Johns | 364/474.29 X |
| 4,893,388 | 1/1990 | Amos et al. | 29/402.13 X |

FOREIGN PATENT DOCUMENTS

| | | | |
|---|---|---|---|
| 3643713 | 6/1988 | Fed. Rep. of Germany | 364/474.31 |
| 355112 | 7/1961 | Switzerland | 29/889.1 |
| 2091139 | 7/1982 | United Kingdom | 29/889.1 |

OTHER PUBLICATIONS

M. Kass, A. Witkin and D. Terzopoulos, "Snakes: Active Contour Models," Proc. First Int. Conf. Compt. Vision & Pat. Recog., London, Eng., Jun. 1987.

A. Benson & D. J. Evans, "A Normalized Algorithm for the Solution of Positive Definite Symmetric Quindiagonal Systems of Linear Equations," ACM Trans. on Math, Software, vol. 3, 1977.

*Primary Examiner*—William Briggs
*Attorney, Agent, or Firm*—Jerome C. Squillaro; Charles L. Moore, Jr.

[57] ABSTRACT

A method and system for machining a contoured surface of a part, such as a vane of a vane segment of a nozzle ring in a gas turbine engine. A plurality of original data points from the original surface of the vane are sensed. The system comprises an algorithm for creating a matrix of data and for generating a revised contour profile corresponding to the cross-sectioned contour of the vane for points which lie in a common plane. The original contour may have missing sections in its profile or may have areas where brazing material has been applied to the vane. The revised contour profile is adjusted in accordance with certain predefined parameters. The revised contour profile is also adjusted so that all of its points lie on or inside the perimeter shape defined by the original data points. All of the revised contour profiles associated with each cross-section of the vane is compiled to generate one machining contour. The system includes a machining station which machines the vane in accordance with the machining contour.

21 Claims, 10 Drawing Sheets

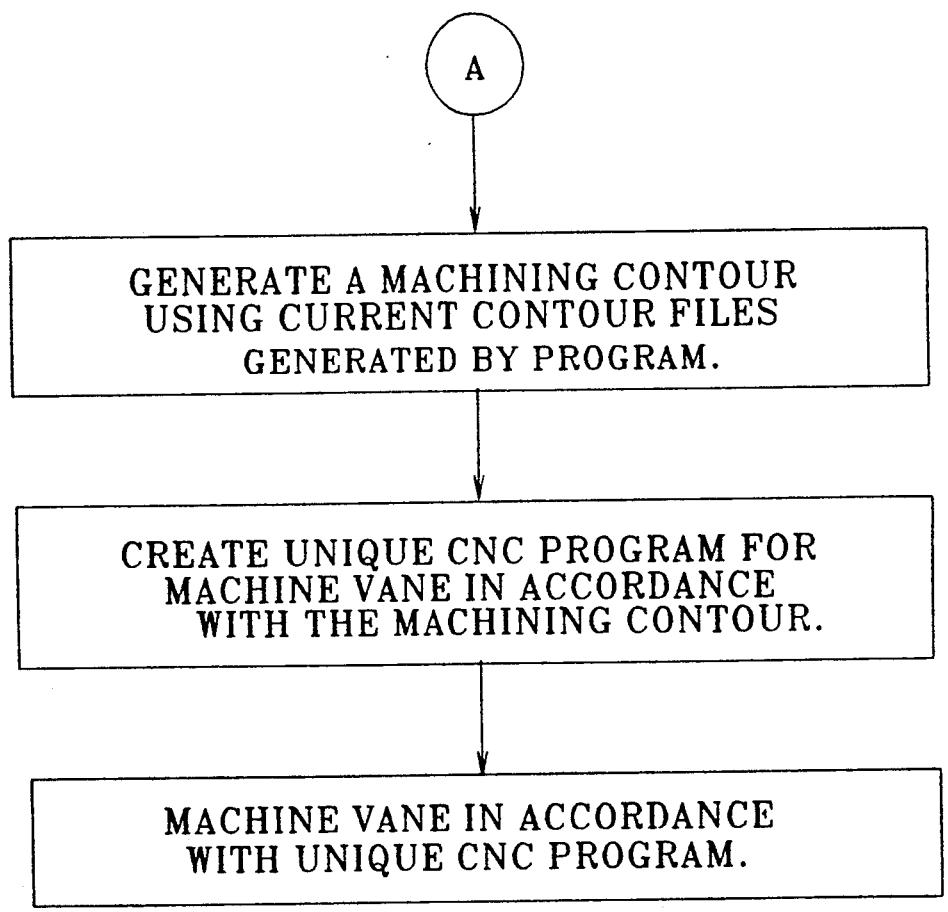

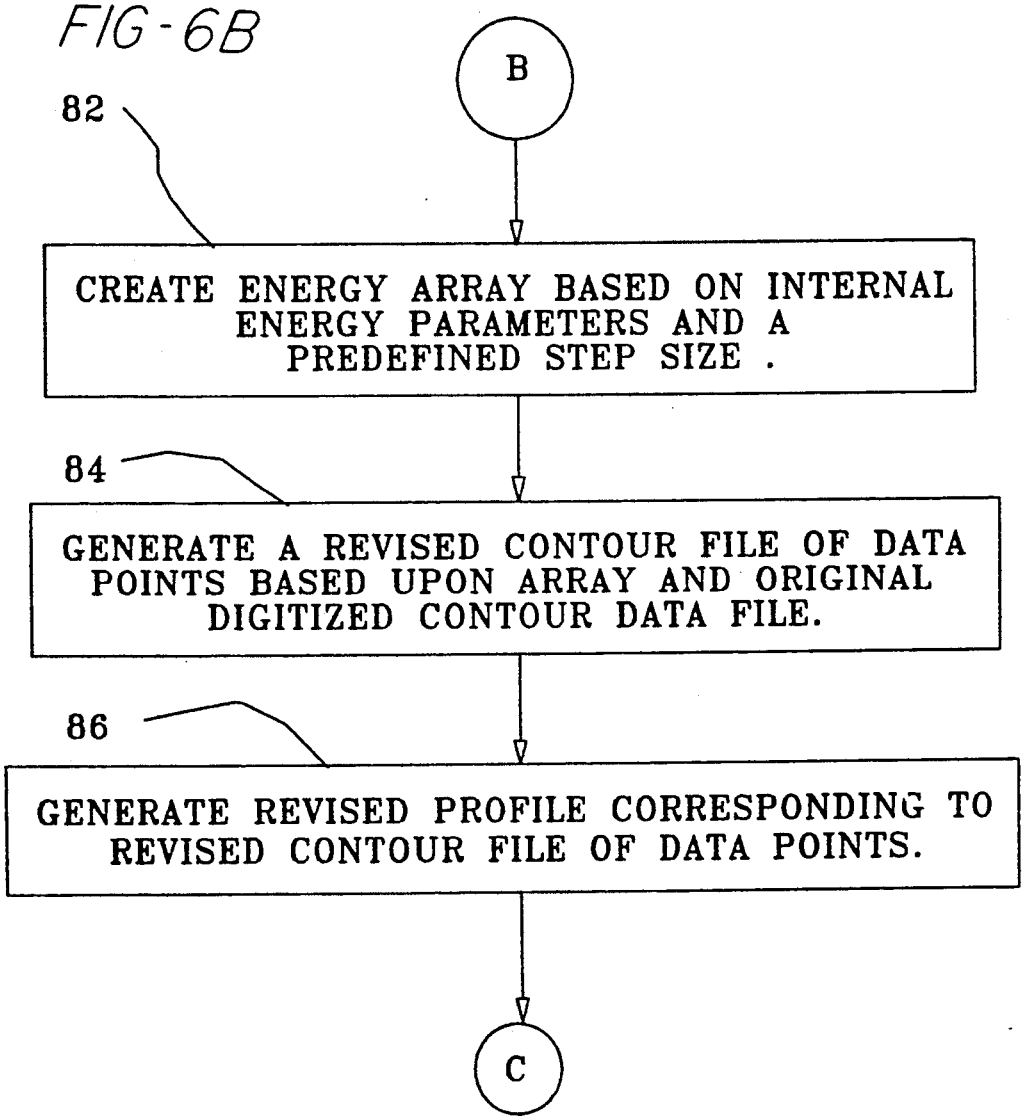

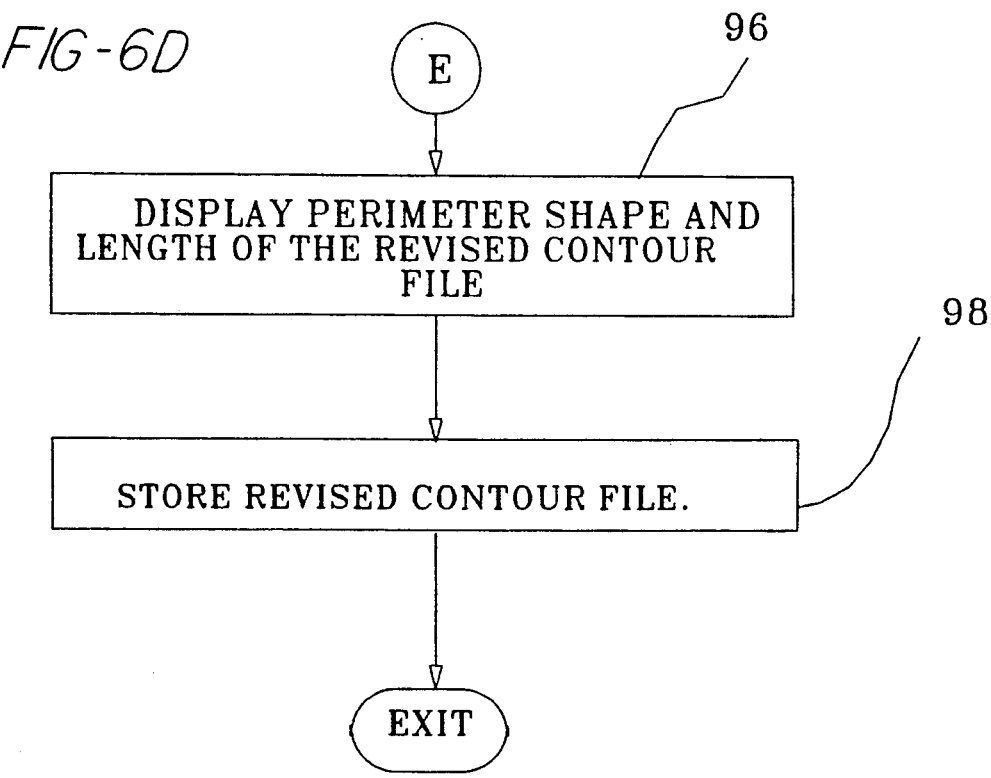

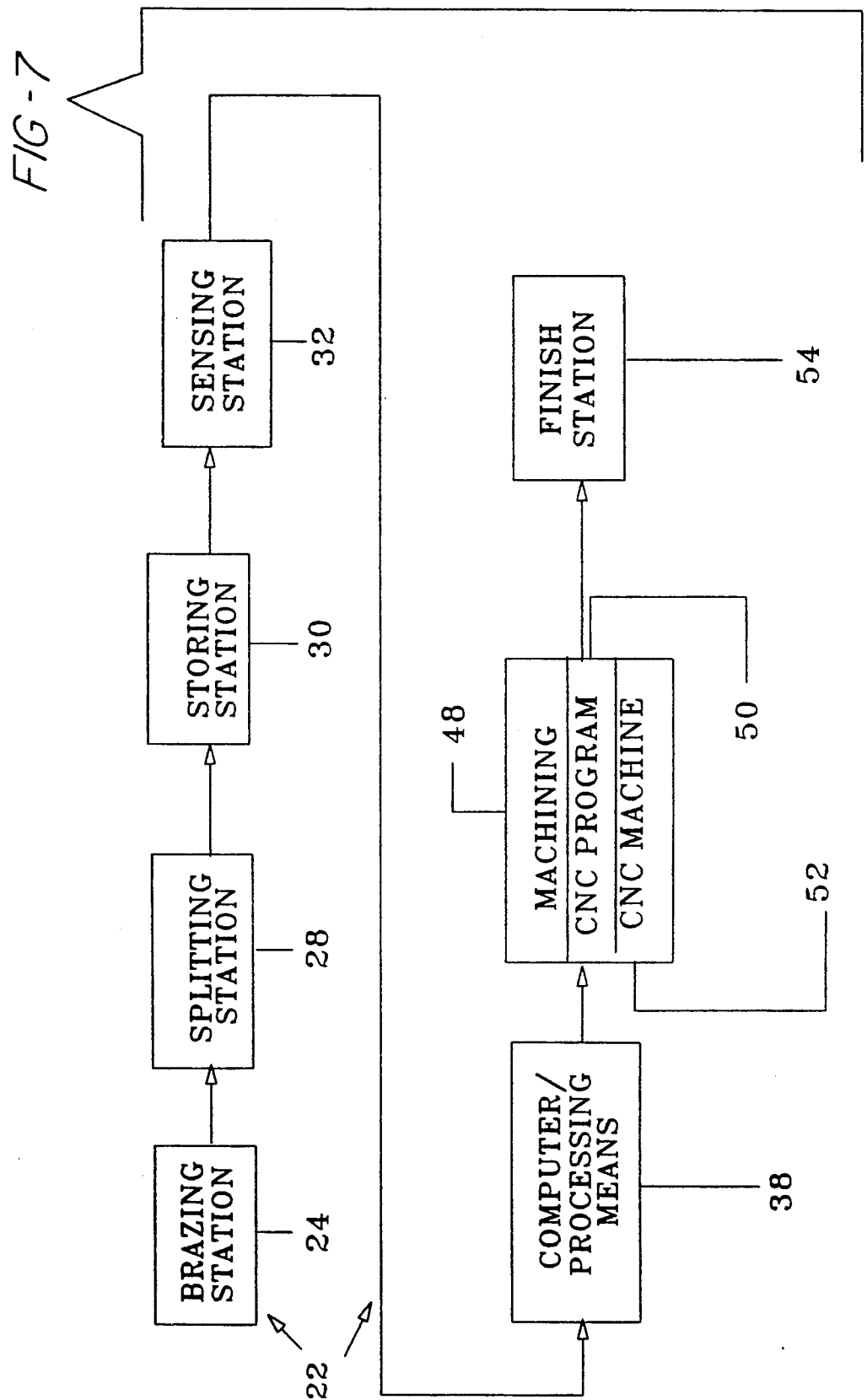

METHOD AND SYSTEM FOR MACHINING CONTOURED PARTS

BACKGROUND OF THE INVENTION

1. Field of the Invention

This invention relates to a method and system for machining a part having a contoured surface and, more particularly, to a method and apparatus for repairing cracks and holes in a vane of a vane segment from a nozzle ring of a gas turbine engine and the like by generating a machining contour profile of the vane using a series of data points from the original surface of the vane.

2. Description of Related Art

In the aircraft industry, various components of the aircraft have to be periodically repaired. For example, high pressure turbine vanes often become cracked and corroded. In order to return the vanes to an operable condition which approximated their original shape, the vanes were heated to approximately 1400° F. and placed into a die under pressure and allowed to cool. The vanes were then typically processed through a fluoride ion cleaning cycle and then vacuum cleaned through a heat treat cycle. In a "clean-room" environment, a braze alloy was manually applied to cracks and pits using a hypodermic needle. The vanes were then processed through a braze operation in a heat treat furnace.

The braze alloy typically had peaks of up to 0.030 inch high or higher wherever the braze alloy was applied. The outer surface of the vane had to be machined to approximately 0.005 inch above the original surface.

In the past, the vane could not be machined in accordance with its original dimensions because the configuration of the vane would change due to thermal stress through normal use. It was also difficult to machine the vane because the underlying surface contour was not known. Accordingly, the peaks of braze alloy material had to be manually removed using high speed pencil grinders which use small grinding wheels or carbide burrs. This manual process is slow and time consuming.

Another disadvantage of current methods for machining the vanes is that it is difficult to obtain the proper vane shape, and an inexperienced operator can easily grind off more braze alloy material than necessary, thereby leaving the part slightly weaker than before. This also can detrimentally impact the number of times the vane can be repaired.

SUMMARY OF THE INVENTION

There is, therefore, a present need to provide a method and apparatus for machining a part or vane by machining the vane in accordance with a machining contour which is generated based upon a series of points taken along an outer surface of the vane.

An object of the present invention is to provide a method and system for generating a machining contour profile or blueprint of an actual outer surface of the vane which may be used to machine the outer surface of the vane.

Another object of the present invention is to provide a system and method for accurately finish grinding the outer surface of the vane so as to minimize the amount of material which is ground off of the vane.

Yet another object of this invention is to provide a process and method for machining a vane which either eliminates or reduces the need for manual grinding.

Another object of the present invention is to provide a process and system which automates the process for repairing a vane and the like by utilizing the actual surface of the vane to generate a machining contour profile or blueprint from which the outer surface of the vane can be machined by a computer numerical machine.

In one aspect of the invention, this invention comprises a method for machining a part based upon actual surface contour of the part, said method comprising the steps of: (a) preparing the part for machining; (b) sensing a series of original digitized contour data points along the surface of the workpiece, said series of original digitized contour data points each lying in a common imaginary plane; (c) calculating an original digitized contour profile corresponding to said series of original digitized contour data points; (d) generating an energy array based upon preselected energy parameters and a preselected step size; (e) generating a revised digitized contour profile using revised data points which are calculated using said series of original digitized contour data points and said energy array; (f) repeating said steps (b)-(e) for another series of original digitized contour data points which lie in another imaginary plane; (g) generating a machining profile from said revised digitized contour profiles; and (h) machining said part in accordance with said machining profile.

Other objects of the invention, together with the features and advantages thereof, will become apparent from the following detailed specification when read in conjunction with the accompanying drawing and claims.

BRIEF DESCRIPTION OF THE DRAWING

FIGS. 5A and 5B, taken together, show a flow diagram of a system for performing the method of the present invention;

FIGS. 6A-6D, taken together, show another flow diagram of the algorithm for generating a revised contour profile of the vane shown in FIG. 3;

FIG. 7 is a flow diagram showing a system in accordance with the present invention.

DESCRIPTION OF THE PREFERRED EMBODIMENT

Figure 1:
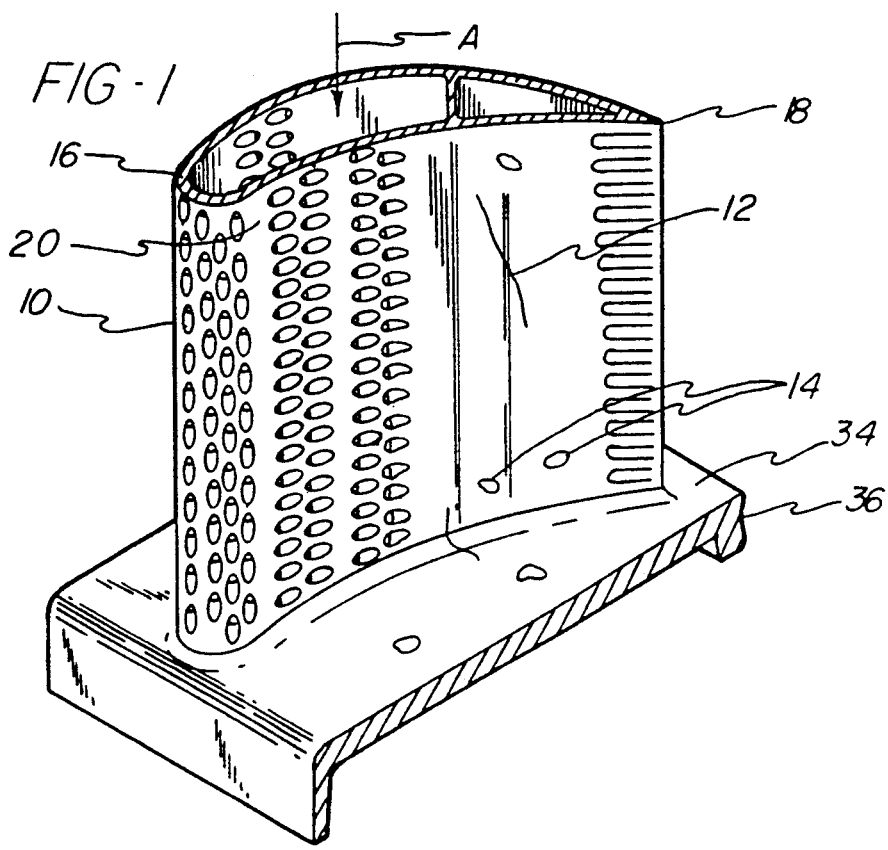
FIG. 1 is a perspective sectional view of a typical vane of a vane segment of a nozzle ring to be repaired.
Figure 2:
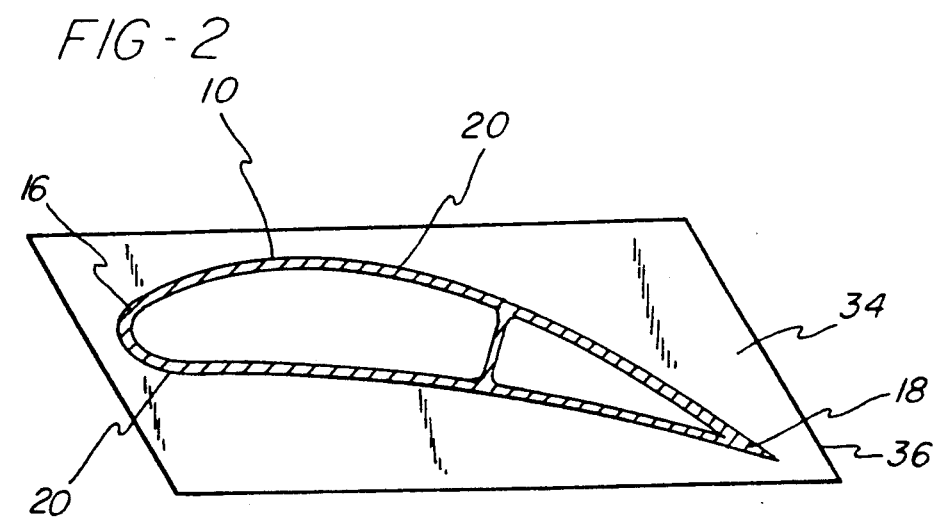
FIG. 2 is a sectional view, taken in the direction of arrow A in FIG. 1, showing a cross-section of the vane.

A typical gas turbine engine comprises a nozzle ring (not shown) consisting of a plurality of vane segments (not shown). Each segment is typically comprised of two separate vanes 10. FIG. 1 is a sectional perspective view of a vane 10 from a vane segment, showing various cracks 12 and holes or pits 14 prior to being repaired in accordance with the present invention. As best shown in FIG. 2, vane 10 comprises a leading edge 16, trailing edge 18 and an outer surface 20.

Figure 3:
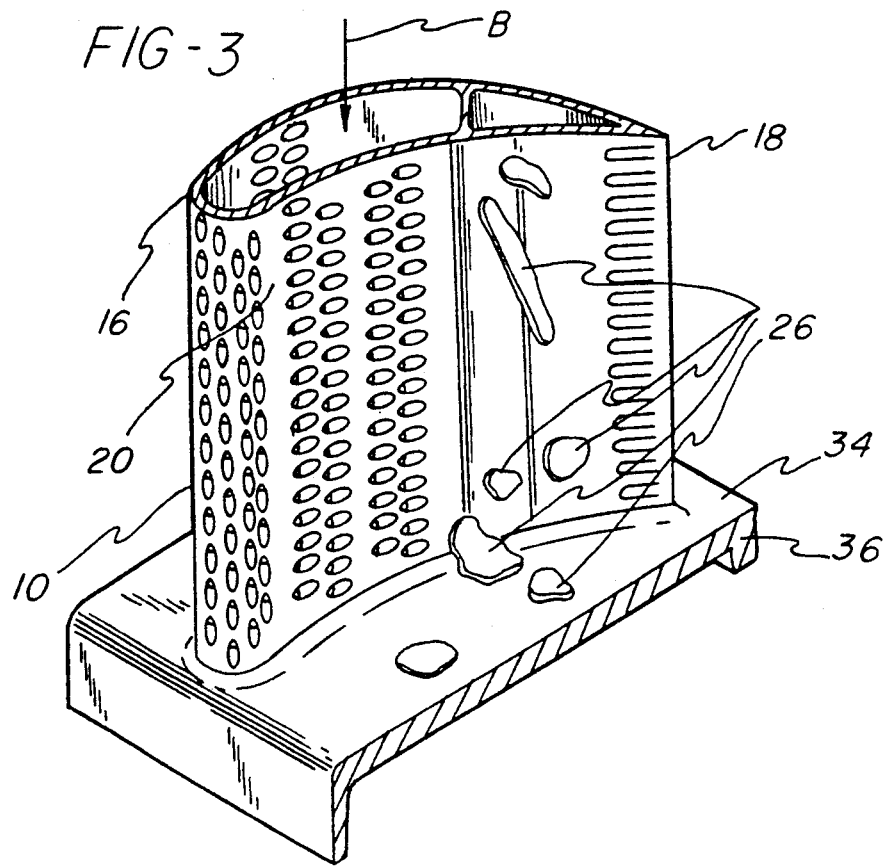
FIG. 3 is a sectional view similar to that of FIG. 1 after braze material has been applied to cracks and pits on the vane.
Figure 4:
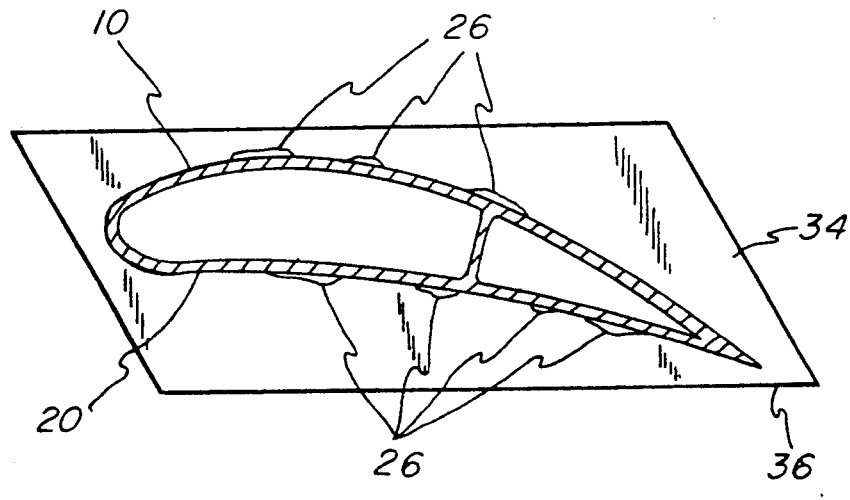
FIG. 4 is a sectional view, taken in the direction of arrow B in FIG. 3, showing a cross-section of the vane after the braze material has been applied.
Figure 5A:
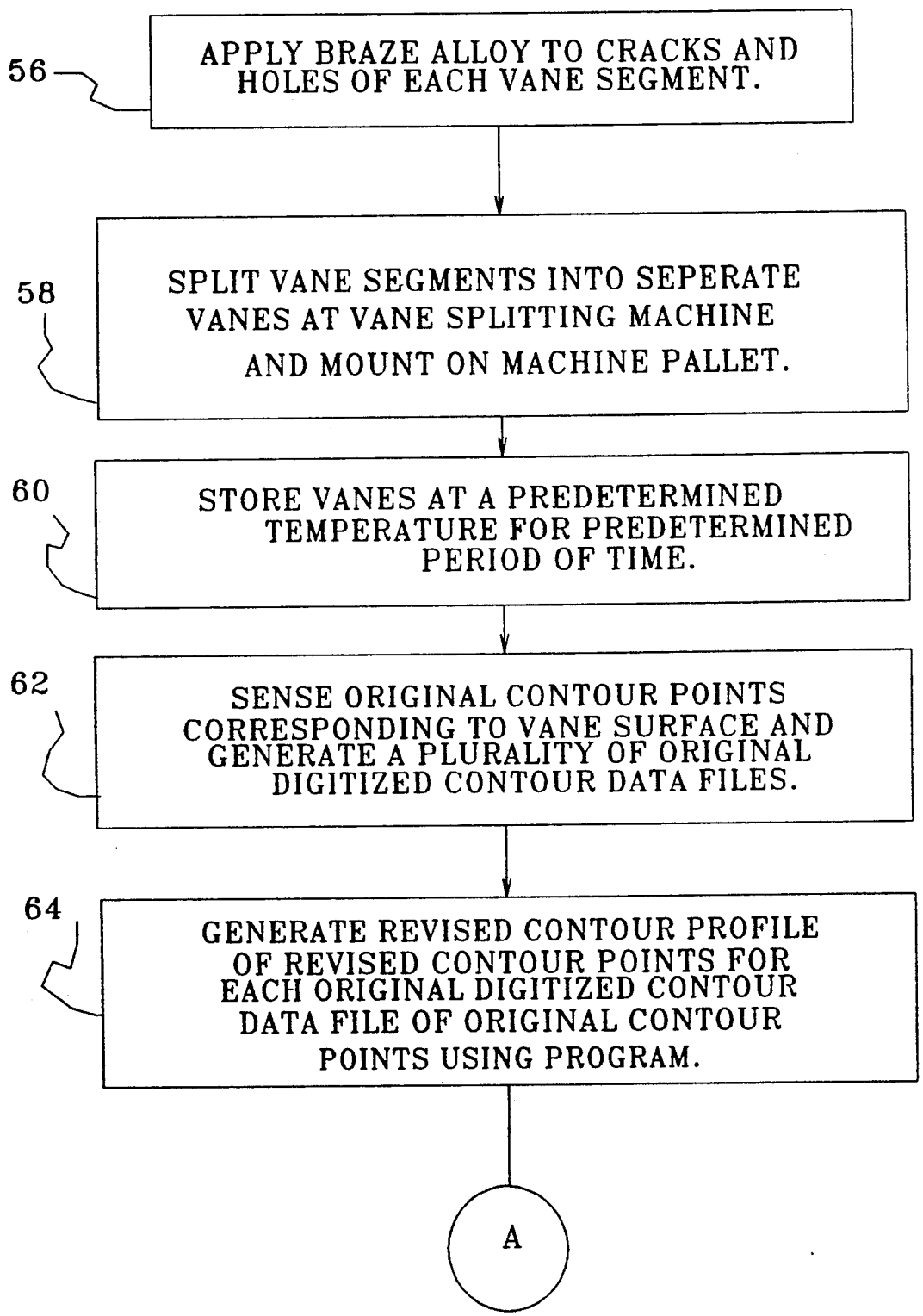

FIGS. 5-7 show a method and system 22 for repairing the cracks 12 and holes 14 in each vane 10 of the vane segment in accordance with the present invention. As shown in block 56 of FIG. 5A, a braze alloy 26 is applied at a brazing station 24 (FIG. 7) to the cracks 12 and holes 14 in a conventional repair process, such as activated diffusion healing (ADH), activated diffusion cladding (ADC), or partitioned alloy component healing (PACH). For example, the braze alloy 26 (FIGS. 3 and 4) may be X40/DIS if vane 10 is made of X40. If the vane 10 is made of R'-80, the braze alloy 26 may be R'80/DIS.

After braze alloy 26 is applied to each vane 10 of each vane segment, the vane segments are split into separate vanes 10 (block 58 in FIG. 5A) at a vane splitting station 28 (FIG. 7) by a vane splitter (not shown). The vane segments are split into separate vanes in order to facilitate machining outer surface 20 of vane 10. In the embodiment being described, the vane splitter could be the Model No. 100 part splitting machine, manufactured by Silicon Technology Corporation of Oakland, N.J. After the vane segments are split into separate vanes 10, the vanes 10 are cleaned and stored at a storing station 30 at a predetermined temperature for a predetermined period of time, as shown by block 60 in FIG. 5A. In the embodiment being described, each vane 10 would be stored at approximately 70° F. for approximately two hours. Once the temperature of vane 10 reaches the predetermined temperature, vane 10 is mounted on a machining pallet (not shown) for further processing.

The vane 10 is then transferred to a sensing station 32 (FIG. 7) where an original digitized contour file of original contour points corresponding to outer surface 20 of vane 10 is generated by sensing the outer surface 20 of vane 10, as shown by block 62 in FIG. 5A. In the embodiment being described, the Model 500 desk top unit manufactured by Laser Design, Inc. of Minneapolis, Minn., has been shown to be an effective sensing device for sensing the series of original digitized contour data points along outer surface 20 of vane 10. The sensor (not shown) at sensing station 32 creates an original digitized contour file of original digitized points, gathering X, Y and Z values, for each point on a preprogrammed path along outer surface 20 of vane 10. It should be noted that the measurements sensed include the contour of brazing alloy 26. The sensor (not shown) senses a plurality or series of original digitized contour data points in a common plane or cross-section which is generally parallel to a surface 34 (FIG. 1) of bracket 36 and which corresponds to the Z axis.

Figure 8:
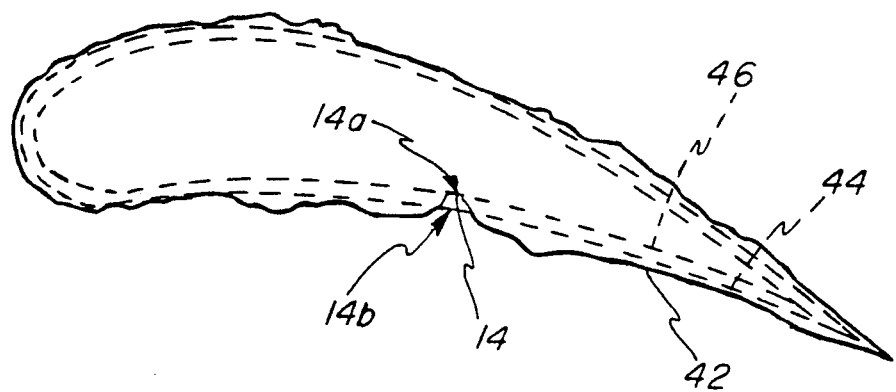
FIG. 8 is a view of a profile of the outer surface of the vane, showing original contour prints along a common plane and also showing a revised contour profile and machining contour generated in accordance with this invention.

As best illustrated in FIG. 7, system 22 also comprises a computer or processing means 38 for receiving the original digitized contour data file generated at sensing station 32 and for generating an original perimeter shape 42 corresponding to the cross-section of the outer surface 20 of vane 10, as shown in cross-section in FIG. 8. In the manner described later herein, a revised contour profile 44 is subsequently generated using the algorithms described herein for each cross-section based upon the original perimeter shape 42 (block 64 in FIG. 5A). A three-dimensional surface model (not shown) or machining contour (block 66 in FIG. 5B) is then generated by accumulating the revised contour profiles 44 for the entire vane 10. As shown by block 70 in FIG. 5B, vane 10 is then machined in accordance with the machining contour, as described below.

The process or method employed by processing means 38 for generating revised contour profile 44 is illustrated in the flow diagrams shown in FIGS. 6A-6D. Processing means 38 finally generates a program which enables system 22 to generate revised contour profile 44 using the original digitized contour data file of original digitized contour data points which correspond to outer surface 20 of vane 10. The system 22 moves a grinding tool (not shown) on a CNC milling machine 52 according to a final revised contour profile 46 which is based on the revised contour profile 44, as described below. In the embodiment being described, the computer or processing means 38 can be any suitable computer, such as an "IBM Model No. 4341" or "VAX®11-785" which are manufactured by "IBM®" Corporation and Digital Equipment Corporation, respectively.

Figure 6A:
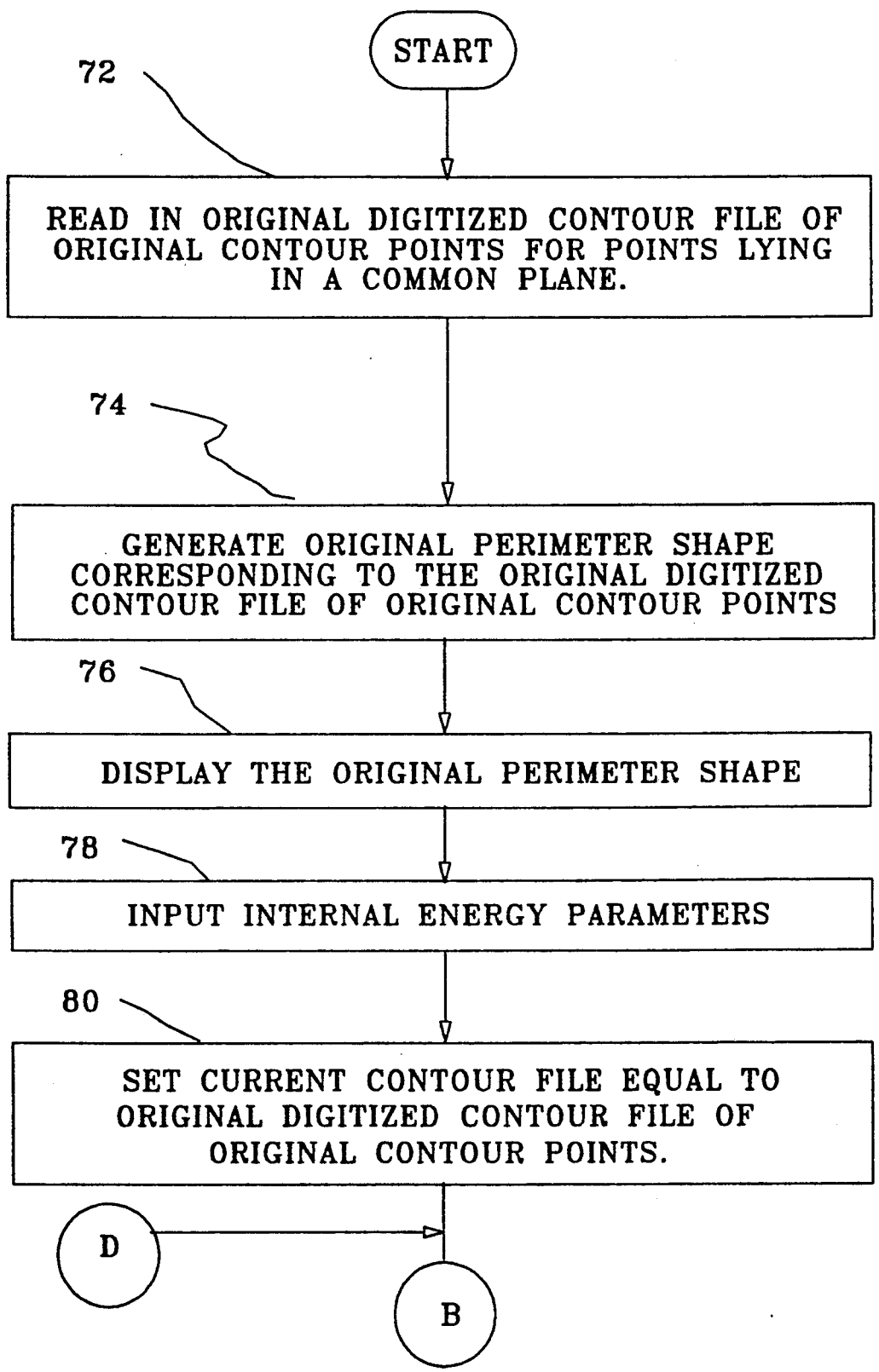
Figure 6C:
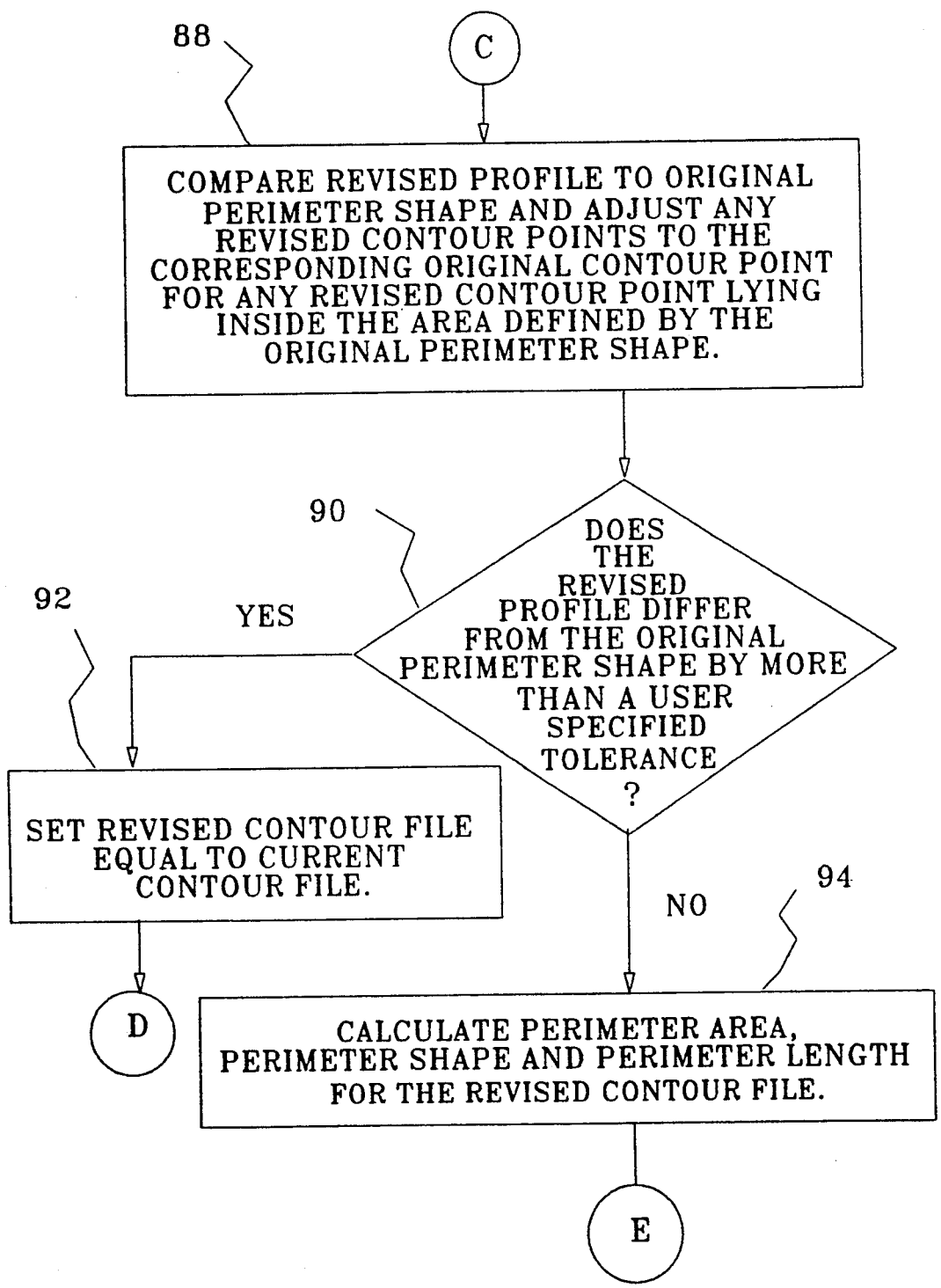

The original digitized contour data files of original contour points are read in and stored in computer or processing means 38 as a series of discrete points, namely, X(j), Y(j), Z(j), where j=1 to N points, as illustrated by block 72 in FIG. 6A. In the embodiment being described, Z(j) was held constant, thus the profile or perimeter shape 42 has a series of X(i), Y(i) points where i=1 to n. This perimeter shape 42 (block 74) is displayed on the monitor (not shown) of system 22 (block 76). The revised contour file 44 for each cross-sectional profile is calculated by minimizing the energy of the perimeter shape 42 by utilizing the equations EQ. 1 to EQ. 8 below. To begin processing, a current contour file is set equal to the original digitized contour file of original contour points (block 80 in FIG. 6A). It should be noted that perimeter shape 42 may have missing sections or holes along its profile. Alternatively, as shown in FIG. 8, the perimeter shape 42 may have bumpy or rough areas corresponding to areas of vane 10 where brazing alloy 26 was applied. The profile points are considered a parametric spline function in (s) defined as:

$$V(s) = (X(s), Y(s)) \qquad \text{EQ. 1}$$

The energy function for the perimeter shape or spline 42 is defined as:

$$E_{TOTAL} \text{ ENERGY} = \int E_{INTERNAL} V(s) ds + E_{EXTERNAL} \qquad \text{EQ. 2}$$

Where $E_{INTERNAL}$ represents the internal energy of the spline due to bending and $E_{EXTERNAL}$ is contributed by external constraint forces. The total energy of the spline is minimized using a two-step process. The first step is to minimize the internal energy and modify the spline or perimeter shape 42. The second step is to further modify the spline or perimeter shape 42 so as to minimize its external energy. The internal spline energy $E_{INTERNAL}$ can be written as:

$$E_{INTERNAL} V(s) = \left( \frac{\left( \alpha(s) \left| \frac{dV(s)}{ds} \right|^2 + \beta(s) \left| \frac{d^2 V(s)}{ds^2} \right|^2 \right)}{2} \right) \qquad \text{EQ. 3}$$

where $\alpha(s)$ and $\beta(s)$ represent arbitrarily selected, adjustable controlling constants for the first and second order terms. The first-order term makes the spline act like a membrane, and the second-order term makes it act like a thin plate. The values of $\alpha(s)$ and $\beta(s)$ are adjusted based on relative or thin-plate effect in the final revised contour profile 46, as desired. In one embodiment, $\alpha(s)$ and $\beta(s)$ are set equal to 1 and 1000, respectively.

$$\left| \frac{dv(s)}{ds} \right|^2$$

represents the magnitude of the first derivative of the spline function (EQ. 3); and $$\left| \frac{d^2v(s)}{ds^2} \right|^2$$

represents the magnitude of the second derivative of the spline function (EQ. 3). The energy function represented by EQ. 3 is minimized to obtain the revised contour profile 44.

The spline energy function in EQ. 3 is approximated. At a given point "i", the internal energy E $(i)_{INTERNAL}$ is given by:

$$E(i)_{INTERNAL} = \frac{\alpha_i |V_i - V_{i-1}|^2}{2h^2} + \frac{\beta_i |V_{i-1} - 2V_i + V_{i+1}|^2}{2h^4} \quad \text{EQ. 4}$$

where we define $V(0) = V(n)$ and $h = \Delta S$.

As shown in FIG. 6, a current contour file is created and set equal to the original digitized contour file for a cross-section profile points (X(i), Y(i)) where Z is held constant. An energy array, based on X(i), Y(i) and internal energy parameters, $\alpha$ and $\beta$, and a predefined step size in parameter S is created. In a preferred embodiment the step size, which equals h, is set equal to 1. In the embodiment being described, the operator inputs the internal energy parameters, $\alpha$ and $\beta$, as shown by block 78 in FIG. 6A. It should be noted that once the internal energy parameters are initially input by the operator, they may be held constant for subsequent iterations. The discrete formulation of the energy function given in EQ. 4 can be minimized by setting its derivative equal to zero. Approximating the differential of EQ. 4 and setting it equal to 0, gives the approximated Euler equation:

$$\alpha_i(V_i - V_{i-1}) - \alpha_{i+1}(V_{i+1} - V_i) + \quad \text{EQ. 5}$$
$$\beta_{i-1}(V_{i-2} - 2V_{i-1} + V_i) - 2\beta_i(V_{i-1} - 2V_i + V_{i+1}) +$$
$$\beta_{i+1}(V_i - 2V_{i+1} + V_{i+2}) = 0$$

where $V_i = V(i)$ as defined by EQ. 1. Because X and Y can be solved independently, the above equation can be written as: $AX = 0$, $AY = 0$, where A is a matrix and $$X = \begin{bmatrix} X_1 \\ X_2 \\ X_3 \\ X_4 \\ X_5 \\ \vdots \end{bmatrix} \quad Y = \begin{bmatrix} Y_1 \\ Y_2 \\ Y_3 \\ Y_4 \\ Y_5 \\ \vdots \end{bmatrix}$$

The equations are solved iteratively using the Euler method, where $$x_t = (A + \gamma I)^{-1}(x_{t-1}) \quad \text{EQ. 6}$$

$$y_t = (A + \gamma I)^{-1}(y_{t-1}) \quad \text{EQ. 7}$$

where $\gamma$ is a time step size (block 82 in FIG. 6B), $x_t$ and $y_t$ are updated original data point of the parameter shape. A user can adjust the step size $\gamma$. In the embodiment being described, the $\gamma$ is always set equal to 1. Explicitly then, $$(A + \gamma I) = \begin{bmatrix} c[1] & b[1] & a[1] & & & a[n-1] & b[n] \\ b[1] & c[2] & b[2] & a[2] & & & a[n] \\ a[1] & b[2] & c[3] & b[3] & a[3] & & \\ & a[2] & b[3] & c[4] & b[4] & a[4] & \end{bmatrix} \quad \text{EQ. 8}$$

where
$a[i] = \beta(i+1)$
$b[i] = -2\beta(i+1) - 2\beta(i) - \alpha(i+1)$
$c[i] = \beta(i+1) + 4\beta(i) + \beta(i-1) + \alpha(i) + \alpha(i+1) + \gamma$
where $i = 1$ to n. The equation $(A + \gamma(I))$ is a positive definite symmetric quindiagonal linear matrix. The inverse of this equation, that is, $(A + \gamma(I))^{-1}$ is calculated by conventional techniques. One method of calculating this inverse equation is described in an article entitled, "*A Normalized Algorithm for the Solution of Positive Definite Symmetrical Quindiagonal Systems of Linear Equations,*" authored by A. Benson and D. J. Evans, and published in Vol. 3, ACM Trans. on Math. Software, 1977, which is incorporated herein by reference and made a part hereof. As shown in blocks 84 and 86 in FIG. 6B, by solving the positive definite symmetric quindiagonal linear matrix, a revised contour file of data points is created. At the completion of step 1, the revised contour file of data points is used to create revised contour profile 44 (FIG. 8). At the completion of step 1 described above, step 2 continues by minimizing the external energy of the revised contour profile 44 as follows.

The external energy is a result of constraints on the spline, as defined by EQ. 2. The revised contour profile 44 is now compared to the perimeter shape 42 (blocks 88 and 90 in FIG. 6C), and if any of the original digitized contour data points represented by perimeter shape 42 (FIG. 8) fall within the revised contour profile 44, the original digitized contour data points act like attractors and attract or pull the revised contour data points thereto. Thus, the original digitized contour data point 14a in FIG. 8 would attract or pull the nearest point of the revised contour profile 44 thereto. This process continues for all points of revised contour profile 44 that fall outside of perimeter shape 42. It is to be noted that any original digitized contour data file point that is an attractor only exerts an influence on the revised contour data points within a user specified distance.

The attraction of a revised contour data point to an original digitized contour data point is the distance that the revised contour data point is adjusted to the corresponding original digitized contour data point. As revised contour file data points move closer to the enclosed original points, the external energy of the spline or perimeter shape 42 is minimized.

Minimizing the revised contour profile 44 ensures that each of the revised contour data points fall nearly on or within perimeter shape 42. In a preferred embodiment, this is necessary because material, such as braze alloy 26, is only removed from vane 10 during the machining process described below. Thus, in the embodiment being described, material is not added to vane 10 to refinish vane 10. The process for minimizing the energy is similar to the process described in the article entitled, "*Snakes:Active Contour Model,*" authored by M. Kass, A. Witkin and D. Terzopoulos and published in 1987 in IEEE, which is incorporated herein by reference and make a part hereof.

The process described above is reiterated by setting the data points in the current contour file (block 92 in FIG. 6C) equal to the adjusted and revised contour profile 44 if the revised contour profile 44 differs from the perimeter shape 42 defined by the current contour file by more than a user-specified tolerance. In this regard, computer or processing means 38 (FIG. 7) calculates a perimeter length for the revised contour profile 44. The processing means 38 also determines the number of original digitized contour data file points which are attractants, as described above. When the perimeter length of the revised contour profile 44 differs from the current contour file (block 90 in FIG. 6C) by more than a predetermined tolerance or the number of attractants reach a predetermined minimum, then the iteration process is complete. In the embodiment being described, the predetermined tolerance is 0.06 inches, and the predetermined minimum number of attractants is five.

The revised contour profile 44 is minimized and the iteration process is continued until a final revised contour profile (identified by number 46 in FIG. 8) is determined. When the iteration process is complete, the perimeter area, perimeter shape and perimeter length for the revised contour file is calculated, as illustrated by block 94 in FIG. 6C. The perimeter shape 42 corresponding to the original digitized contour data file of points and final revised contour profile 46 is then displayed (block 96 in FIG. 6D). The current contour file corresponding to the final revised contour profile 46 is then stored (block 98) in processing means 38.

At this point, the revised contour profile 44 for Z(j) is complete. The next original digitized contour file of original digitized contour data points lying in another imaginary plane, that is, another Z value (Z(j+1)). The process is reiterated until all of the original digitized contour data points for all values of Z(j), where j=1 to N, have been processed. After a final revised contour profile 46 has been created for each original digitized contour profile of original contour points, the revised contour profiles 46 are compiled by processing means 38 which generates a file ready for machining station 48, hereinafter referred to as "machining file", for the entire outer surface 20 of vane 10. The machining file is transferred from processing means 38 to machining station 48 where vane 10 is machined.

The machining station 48 comprises a computer aided design/computer aided manufacturing (CADCAM) program (not shown) which generates a computer numerical control (CNC) program 50 based on the machining file. The CNC program 50 is used by the CNC machine 52 to machine vane 10 in accordance with the machining file. In the embodiment being described, the CADCAM program can be any suitable program for converting the machining contour data to a form which is suitable for CNC machine 52. For example, a program known as Catia manufactured by IBM Corporation of White Plains, N.Y., could be used. In addition, a program known as Camax, manufactured by Camax Systems, Inc. of Minneapolis, Minn.; and a program known as Servecam, manufactured by Serveware, Incorporated, San Fernando, Calif., are also suitable CADCAM programs which may be modified for use for this purpose. In the embodiment being described, CNC machine 52 is a 5-axis milling machine. One suitable 5-axis milling machine is the Model Bostamatic 405 manufactured by Boston Digital of Milford, Mass. After the CNC program 50 is created, it is used by CNC machine 52 to machine vane 10 according to the machining profile.

After vane 10 has been machined in accordance with the machining contour, vane 10 is transferred to a finishing station 54 where vane 10 is manually finish ground by suitable means, such as a handheld ball nose grinder (not shown). In the embodiment being described, the finish grinding may be needed to remove metal alloy 26, for example, located on surface 34 of bracket 36 or in places where CNC machine 52 could not adequately mill, such as in fillet locations. The finish station 54 may also comprise means for removing cusps and finish mill marks from vane 10 in order to further finish vane 10. One suitable machine for removing the cusps and finish mill marks from vane 10 is the abrasive flow machine Model No. 77B manufactured by Extrude Hone of Erwin, Penna.

After the cusps and mill marks have been removed, vane 10 is degreased and removed from the workpiece pallet (not shown). Once each vane 10 from each vane segment has been machined as described above, each pair of vanes 10 is welded back together to form a complete vane segment. The vane segments are then reassembled to form a complete nozzle ring which can be reinstalled in the gas turbine engine.

From the foregoing specification, it will be clear to those skilled in the art that the present invention is not limited to a specific embodiment described and illustrated and that numerous modifications and changes are possible without departing from the scope of the present invention. Accordingly, it is intended that the invention be limited only by the spirit and scope of the claims appended hereto.

We claim:

1. A method for machining a workpiece using measurements taken from a surface of the workpiece, said method comprising the steps of:
   (a) preparing the workpiece for machining;
   (b) sensing a series of original digitized contour data points along the surface of the workpiece, said series of original digitized contour data points each lying in a common plane;

(c) calculating an original digitized contour profile corresponding to said series of original digitized contour data points;

(d) generating an energy function array based upon preselected energy parameters and a preselected step size;

(e) generating a revised contour profile using revised data points which are calculated using said series of original digitized contour data points and said energy array;

(f) repeating said steps (b)–(e) for another series of original digitized contour data points which lie in another imaginary plane;

(g) generating a machining profile from said revised contour profiles; and (h) machining said workpiece in accordance with said machining profile.

2. The method as recited in claim 1 wherein said calculating step (c) comprises the step of:

(c)(1) displaying said original digitized contour profile.

3. The method as recited in claim 2 wherein said generating step (e) further comprises the steps of:

(e)(1) comparing said revised contour profile to said original digitized contour profile;

(e)(2) adjusting any revised data points toward the corresponding original digitized contour data point if said revised data points fall outside the original digitized contour profile; and (e)(3) storing said revised contour profile.

4. The method as recited in claim 3 wherein said workpiece is a vane from a vane segment of a nozzle ring in a gas turbine engine, said preparing step (a) further comprising the steps of:

(a)(1) applying a braze alloy to cracks and holes in said vane segment;

(a)(2) heat treating said vane segment;

(a)(3) splitting each vane segment into separate vanes;

(a)(4) storing the vanes at room temperature for a predetermined period of time;

(a)(5) mounting each of said separated vane onto a machining pallet.

5. The method as recited in claim 4 wherein said machining step (h) is effected by a multi-axis computer numerical control machine, said step (h) further comprising the steps of:

(h)(1) manually finish grinding said vane;

(h)(2) using an abrasive flow machine to remove cusps and finish mill marks from said vane;

(h)(3) inspecting said vane.

6. The method as recited in claim 1 wherein said predetermined step size is 1, said step (e) further comprises the step of:

(e)(1) calculating said revised contour profile by minimizing the energy represented by the equation:

$$E_{INTERNAL}V(s) = \left( \frac{\left( \alpha(s) \left| \frac{dv(s)}{ds} \right|^2 + \beta(s) \left| \frac{d^2v(s)}{ds^2} \right|^2 \right)}{2} \right)$$

where $V(s) = (X(s), Y(s))$ $\alpha(s) =$ a number between 1 and 10

$\beta(s) =$ a number between 100 and 1500

7. The method as recited in claim 6 wherein $\alpha = 1$ and $\beta = 1000$.

8. The method as recited in claim 1 wherein said machining step (h) further comprises the steps of:

(h)(4) converting said machining profile to a computer numerical control program;

(h)(5) grinding said vane in accordance with said computer numerical control program.

9. A method for repairing cracks, pits and holes in a vane of a vane segment of a nozzle ring from a gas turbine engine, said method comprising the steps of:

(a) applying a braze alloy to said cracks, pits and holes in said vane segment;

(b) heat treating said vane segment;

(c) splitting each vane segment into separate vanes;

(d) storing said heat treated vane at a predetermined temperature for a predetermined period of time;

(e) sensing a series of original digitized contour data points along a surface of the vane;

(f) calculating an original digitized contour profile corresponding to said series of original contour data points;

(g) generating an energy array based upon preselected energy parameters and a preselected step size;

(h) generating a revised digitized contour profile using revised data points which are calculated using said series of original digitized contour data points which lie in the same imaginary plane which bisects said vane and said energy array;

(i) repeating said steps (b)–(e) for another series of original digitized contour data points which lie in another imaginary plane;

(j) generating a machining profile from said revised digitized contour profiles; and (k) machining said vane in accordance with said revised digitized contour profile in order to remove any unwanted braze alloy.

10. The method as recited in claim 9 wherein said generating step (h) further comprises the steps of:

(h)(1) comparing said revised data points to said series of original digitized contour data points;

(h)(2) adjusting any revised data points toward the corresponding original digitized contour data point if said revised data points fall outside the original digitized contour profile; and (h)(3) storing said revised digitized contour profile.

11. The method as recited in claim 9 wherein said machining step (k) is effected by a 5-axis computer numerical control machine, said step (k) further comprising the steps of:

(k)(1) manually finish grinding said vane;

(k)(2) using an abrasive flow machine to remove cusps and finish mill marks from said vane;

(k)(3) inspecting said vane.

12. The method as recited in claim 9 wherein said machining step (k) further comprises the steps of:

(k)(1) converting said machining profile to a computer numerical control program;

(k)(2) grinding said vane in accordance with said computer numerical control program to remove said unwanted braze alloy.

13. A system for repairing cracks and holes in vane segments of a nozzle ring in a high pressure turbine, each of said vane segments comprising a plurality of vanes, said system comprising:

a brazing station for filling said cracks and holes with a brazing compound by activated diffusion healing;

a splitter for splitting said vane segments into separate vanes;

a storing station for storing said separate vanes at a predetermined temperature for a predetermined period of time;

a sensor for sensing a plurality of original contour points on an outer surface of one of said vane and for generating an original digitized contour file of data for a plurality of points which lie in an imaginary plane relative thereto;

processing means for receiving said original digitized contour file of data and also for receiving preselected energy parameters and for generating a machining profile in response thereto; and a machining station for machining said vane in accordance with said machinery profile.

14. The system as recited in claim 13 wherein said machining station further comprises:

programming means for receiving said machining profile and for generating a computer numerical control program corresponding thereto;

a 5-axis computer numerical control machine for machining said vane in accordance with said computer numerical control program.

15. The system as recited in claim 14 wherein said programming means comprises a VAX®11-785.

16. The system as recited in claim 14 wherein said system further comprises a finishing station having an abrasive flow machine for removing cusps and finish mill marks from said vane.

17. The system as recited in claim 13 wherein said processing means comprises a program for receiving said original digitized contour file of data for said plurality of original contour points which lie in a common imaginary plane and also for receiving said preselected energy parameters;

said program comprising:

first generating means for receiving said preselected energy parameters and a predetermined step size and for generating an energy array based thereon;

second generating means for receiving said energy array of data and said original digitized contour file of data for original contour points lying in a common imaginary plane and also for generating a revised contour file of data of revised contour points.

18. The system as recited in claim 17 wherein said processing means comprises third generating means for accumulating said revised data points for a plurality of imaginary planes and also for generating a machining profile based thereon.

19. The system as recited in claim 13 wherein said sensor comprises a stylus for measuring the location of said plurality of points by manually moving said stylus in an imaginary plane and on a cross-sectional line along said outer surface of said vane.

20. The system as recited in claim IS wherein said second generating means generates said revised contour file of data by minimizing the equation $$E_{INTERNAL}V(s) = \left( \frac{\left( \alpha(s) \left| \frac{dV(s)}{ds} \right|^2 + \beta(s) \left| \frac{d^2V(s)}{ds^2} \right|^2 \right)}{2} \right)$$

where V(s)=X(s), Y(s)

α(s)=a number between 1 and 10

β(s)=a number between 100 and 1500

21. The system as recited in claim 22 wherein α(s)=1 and β(s)=1000.

* * * * *